United States Patent
Takano

(10) Patent No.: US 8,411,292 B2
(45) Date of Patent: Apr. 2, 2013

(54) IMAGE PROCESSING APPARATUS, IMAGE PROCESSING SYSTEM, AND CONTROL METHOD FOR IMAGE DATA TRANSMISSION

(75) Inventor: Shinichi Takano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 12/605,919

(22) Filed: Oct. 26, 2009

(65) Prior Publication Data

US 2010/0110486 A1  May 6, 2010

(30) Foreign Application Priority Data

Oct. 31, 2008  (JP) ................. 2008-281856

(51) Int. Cl.
*G06F 3/12* (2006.01)
*G06F 15/00* (2006.01)
*G06K 1/00* (2006.01)
*H04N 1/60* (2006.01)

(52) U.S. Cl. ............ 358/1.13; 358/1.15; 358/1.9

(58) Field of Classification Search .......... None
See application file for complete search history.

(56) References Cited

U.S. PATENT DOCUMENTS

| | | | |
|---|---|---|---|
| 2005/0046887 A1* | 3/2005 | Shibata et al. | 358/1.13 |
| 2006/0061788 A1* | 3/2006 | Takano | 358/1.13 |
| 2006/0136992 A1* | 6/2006 | Shigeeda | 726/2 |
| 2007/0188824 A1* | 8/2007 | Imamichi | 358/448 |
| 2008/0068640 A1* | 3/2008 | Todaka | 358/1.14 |
| 2008/0304100 A1* | 12/2008 | Kita | 358/1.15 |
| 2009/0259880 A1* | 10/2009 | Sato | 714/2 |

FOREIGN PATENT DOCUMENTS

| | | |
|---|---|---|
| JP | 7321967 A | 12/1995 |
| JP | 2004-287860 A | 10/2004 |
| JP | 2004280665 A | 10/2004 |
| JP | 2006094516 A | 4/2006 |
| JP | 2007235921 A | 9/2007 |
| JP | 2008022107 A | 1/2008 |
| JP | 2008078759 A | 4/2008 |
| JP | 2008256799 A | 10/2008 |
| KR | 100574019 B1 | 4/2006 |
| KR | 1020080030316 A | 4/2008 |

* cited by examiner

*Primary Examiner* — Ming Hon

(74) *Attorney, Agent, or Firm* — Canon USA Inc IP Division

(57) ABSTRACT

An image processing apparatus including a reading unit configured to read an image of a document to generate image data based on the read image acquires a process definition file, which defines a content of reading processing to be executed by the reading unit and a content of transmission processing for transmitting image data generated by the reading unit, causes the reading unit to execute reading processing to generate image data according to a definition included in the acquired process definition file, and, when a plurality of process definition files is selected and the selected plurality of process definition files is instructed to be executed, causes the generated image data to be transmitted according to a definition included in each of the selected plurality of process definition files.

14 Claims, 17 Drawing Sheets

FIG.5

410 PROCESS DEFINITION FILE

```
<?xml version="1.0"encoding="UTF-8"?>
501 — <Process id="0001"caption="SCAN AND SEND TO DIVISION MANAGER BY E-MAIL">
502 —   <Scan>
503 —     <Setting type="color">
            GRAY_SCALE
          </Settinng>
          <Setting>…</Setting>
        </Scan>
504 —   <Send type="email">
505 —     <Setting type="address">
            manager@xxxx.xxxx
          </Setting>
          </Setting>…</Setting>
        </Send>
      </Process>
```

FIG.13

1300 PROCESS DEFINITION FILE

```
<?xml version="1.0"encoding="UTF-8"?>
<Process id="0036"caption="SCAN AND SEND TO MY ADDRESS BY E-MAIL">
    <Scan>
        <Setting type="color">
            GRAY_SCALE
        </Settinng>
        <Setting>...</Setting>
    </Scan>
    <Send type="email">
        <Setting type="address">
            user_pc@xxxx.xxxx
        </Setting>
        <Setting>...</Setting>
    </Send>
</Process>
```

1301 → user_pc@xxxx.xxxx

FIG.14

1400 PROCESS DEFINITION FILE

```
<?xml version="1.0"encoding="UTF-8"?>
<Process id="-"caption="-">
    <Scan>
        <Setting type="color">
            GRAY_SCALE
        </Settinng>
        <Setting>...</Setting>
    </Scan>
    <Send type="email">
        <Setting type="address">
            manager@xxxx.xxxx, user_pc@xxxx.xxxx
        </Setting>
        </Setting>...</Setting>
    </Send>
</Process>
```

1401 — <Process id="-"caption="-">

1402 — <Setting type="address">

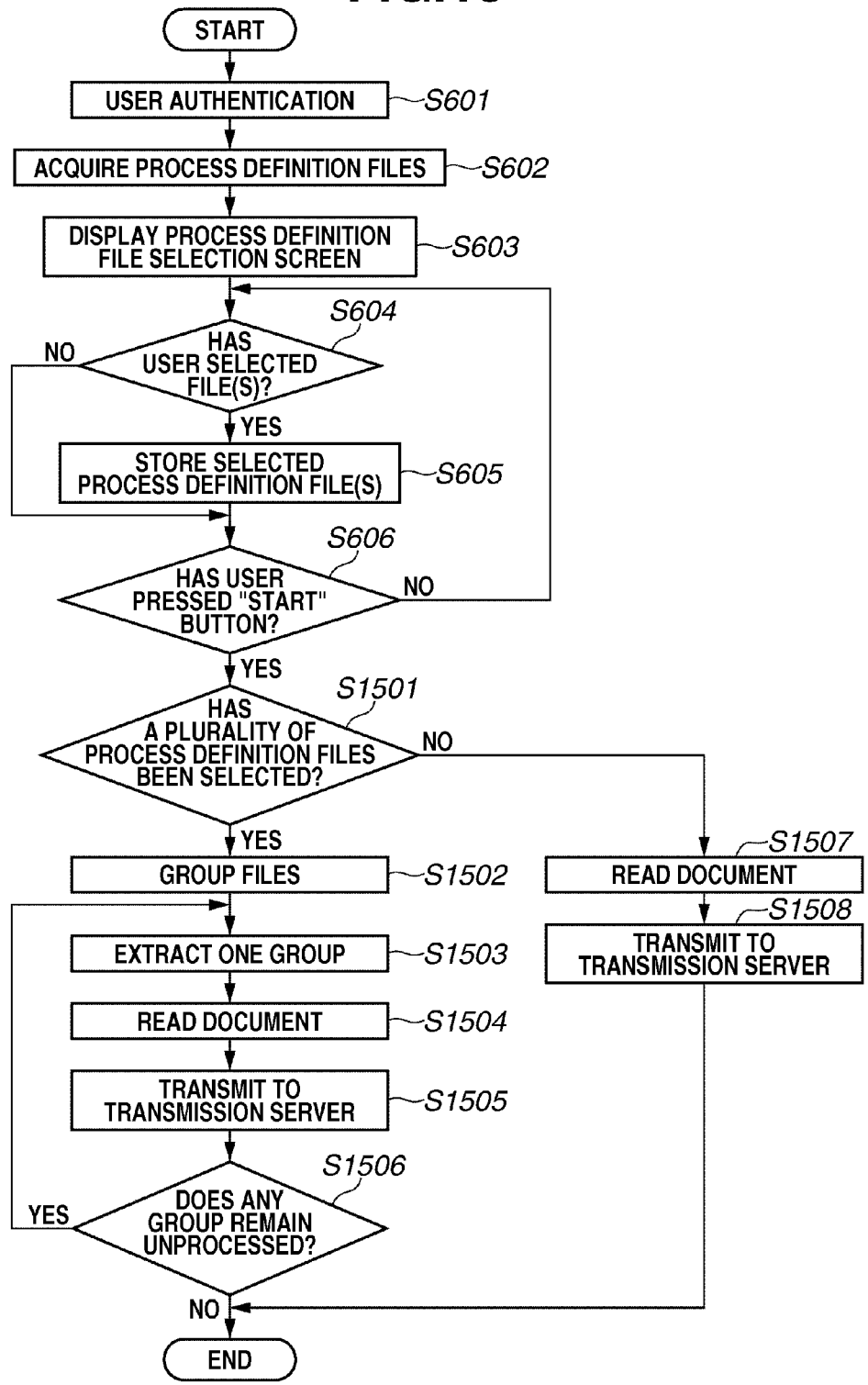

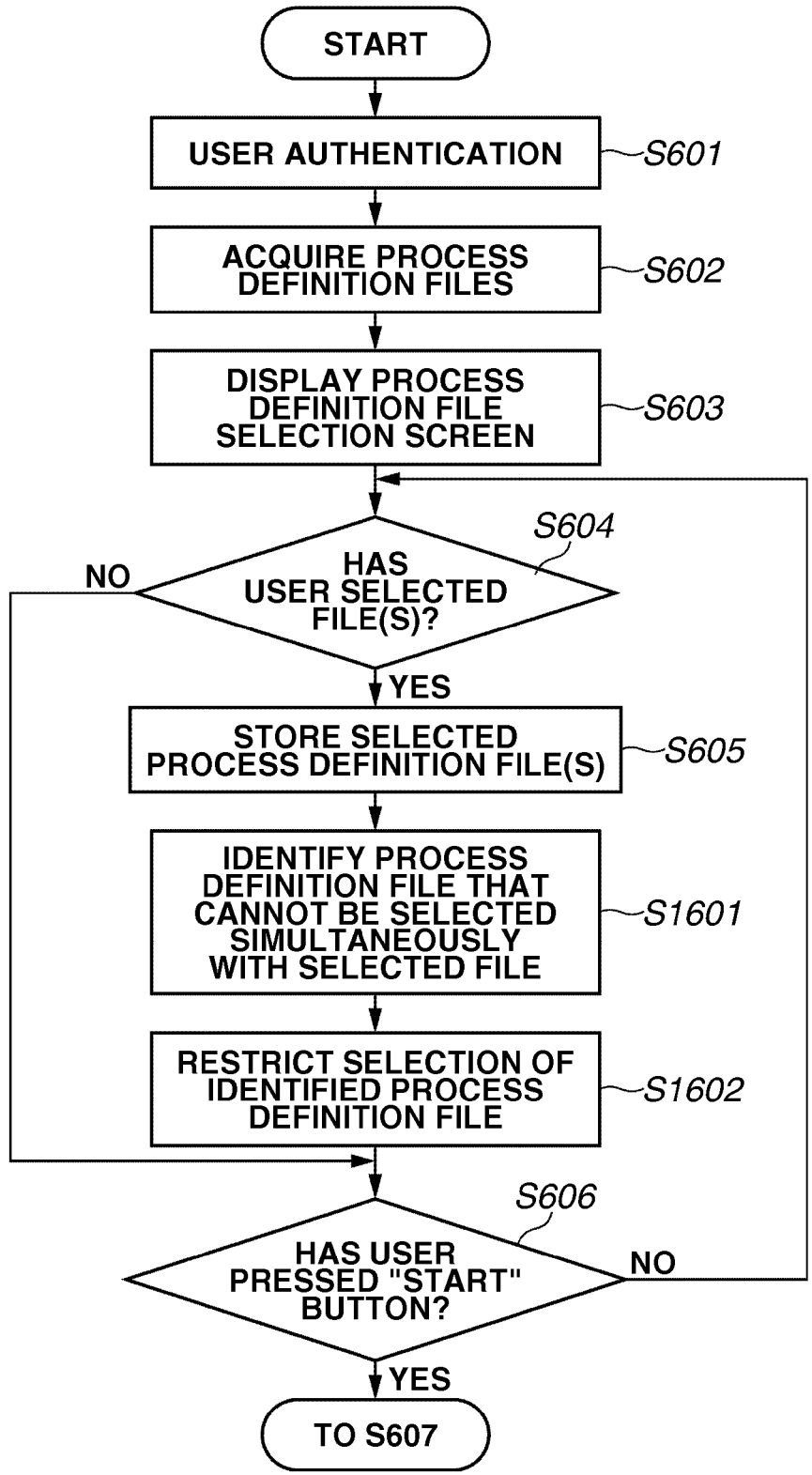

IMAGE PROCESSING APPARATUS, IMAGE PROCESSING SYSTEM, AND CONTROL METHOD FOR IMAGE DATA TRANSMISSION

BACKGROUND OF THE INVENTION

1. Field of the Invention

The present invention relates to an image processing apparatus and an image processing system configured to execute processing according to a process definition file which defines reading processing and transmission processing. In addition, the present invention relates to a control method for the image processing apparatus and the image processing system.

2. Description of the Related Art

In recent years, conventional image processing apparatuses including a reading function for reading an image of a document and generating image data of the read document image and a transmission function for transmitting the generated image data have been widely used. In utilizing such image processing apparatuses, a user designates a reading parameter to be used as a processing setting for reading an image of a document and also designates a transmission protocol and a transmission destination to be used as a processing setting for transmitting the generated image data. The image processing apparatus reads an image of a document and transmits the generated image data in accordance with the designations made by the user.

In executing processes using a combination of a plurality of functions as described above, it is necessary for a user to designate a large number of parameters. Accordingly, it is necessary for the user to execute complicated operations.

In order to solve the above-described problem, Japanese Patent Application Laid-Open No. 2004-287860 discusses a method, when a plurality of services are performed in cooperation with one another, for processing a document according to a previously generated instruction which defines a plurality of processes to be executed.

According to the method discussed in Japanese Patent Application Laid-Open No. 2004-287860, it is necessary for a user only to issue an instruction to repeat a previously generated instruction to serially execute the processes according to the earlier instruction. Accordingly, it is not necessary for the user to perform complicated operations repeatedly.

In the conventional method discussed in Japanese Patent Application Laid-Open No. 2004-287860, for example, in executing an instruction described therein, a user can only select one instruction and instruct execution of that selected one instruction.

More specifically, the conventional method receives the user selection of one instruction only and, if the user has instructed the execution of the selected one instruction, then executes processing according to a definition included in the selected one instruction.

However, if it is allowed for a user to select only one instruction as described above, the following problem may arise.

More specifically, if a user desires to execute more than one instruction, it is necessary for the user to select a first instruction and the execution of the first instruction and after the processing according to the first instruction is completed then to select a second instruction and the execution of the second instruction. Therefore, in this case, it is necessary for the user to perform complicated operations.

Furthermore, if reading processing for reading an image of a document is defined in an instruction, the above-described problem may become more serious. If each instruction defines reading processing, the above-described conventional method executes the reading processing every time an instruction is executed. Accordingly, in executing a plurality of instructions, the above-described conventional method necessarily executes reading processing a plurality of times.

However, if the reading processing defined in the plurality of instructions is the same, then the above-described conventional method will generate a plurality of pieces of the same image data by executing the same reading processing according to the description in each instruction.

Accordingly, the above-described conventional method also executes unnecessary operations by executing the reading processing a large number of times to generate the same image data.

SUMMARY OF THE INVENTION

The present invention is directed to an image processing apparatus and an image processing system capable, when a user instructs execution of a selected plurality of process definition files, of transmitting image data according to a definition included in each of the selected plurality of process definition files, and is also directed to a control method for the image processing apparatus and the image processing system.

According to an aspect of the present invention, an image processing apparatus includes a reading unit configured to read an image of a document to generate image data based on the read image, an acquisition unit configured to acquire a process definition file, which defines a content of reading processing to be executed by the reading unit and a content of transmission processing for transmitting image data generated by the reading unit, a reading control unit configured to cause the reading unit to execute the reading processing to generate image data according to a definition included in the process definition file acquired by the acquisition unit, a file selection unit configured to select the process definition file acquired by the acquisition unit, and a transmission control unit configured to, when a plurality of process definition files is selected by the file selection unit and the selected plurality of process definition files is instructed to be executed, cause image data generated by the reading control unit to be transmitted according to a definition included in each of the selected plurality of process definition files.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 illustrates a specific example of a description included in a process definition file according to an exemplary embodiment of the present invention.

FIG. 13 illustrates a specific example of a description included in a process definition file according to an exemplary embodiment of the present invention.

FIG. 14 illustrates a specific example of a description included in a process definition file according to an exemplary embodiment of the present invention.

FIG. 15 is a flow chart illustrating an exemplary operation of the MFP according to an exemplary embodiment of the present invention.

FIG. 16 is a flow chart illustrating an exemplary operation of the MFP according to an exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described in detail below. In the first exemplary embodiment, a method configured to, when a user has instructed the execution of a selected plurality of process definition files, cause a transmission server 104 to transmit image data according to a definition described in each of the selected plurality of process definition files will be primarily described.

Figure 1:
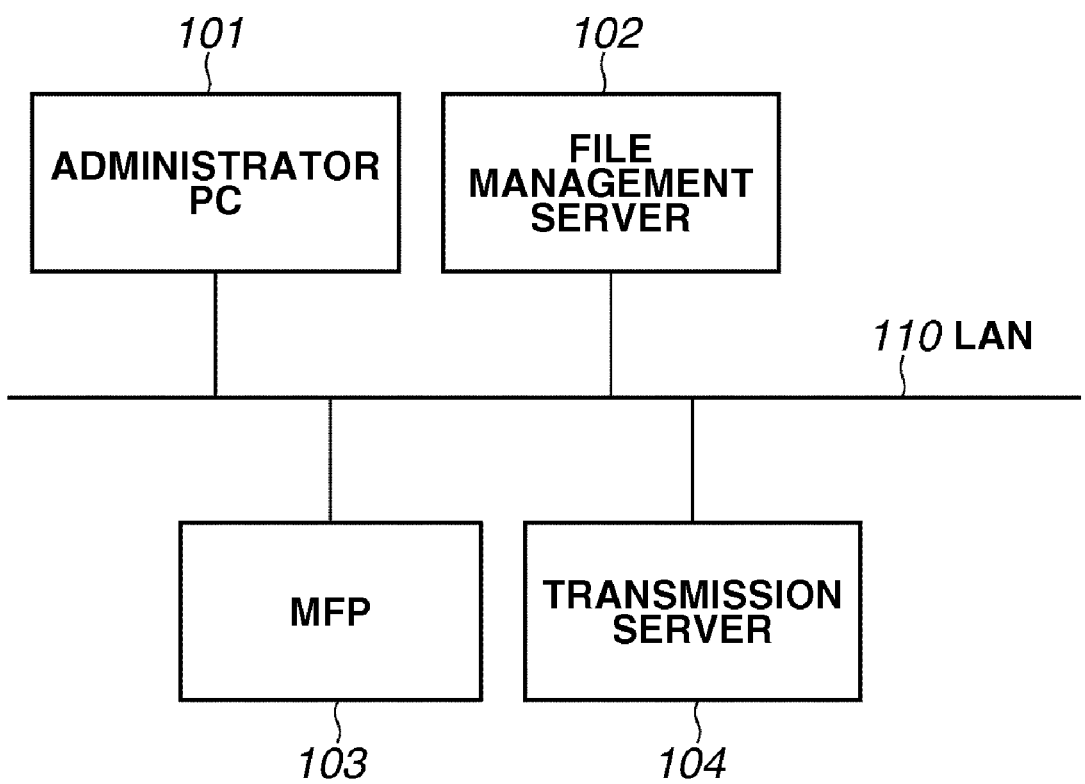
FIG. 1 illustrates an example of the entire configuration of an image processing system according to an exemplary embodiment of the present invention.

FIG. 1 illustrates an exemplary configuration of the entire image processing system according to the first exemplary embodiment.

Referring to FIG. 1, an administrator PC 101, a file management server 102, an MFP 103, and the transmission server 104 are in communication with one another via a local area network (LAN) 110.

Although not illustrated in FIG. 1, an e-mail server and a file transfer protocol (FTP) server are provided on the LAN 110. With this configuration, the transmission server 104 and a user PC 105 (not illustrated but is also connected to the LAN 110) can transmit and receive an e-mail and also transmit and receive image data by using an FTP protocol via the LAN 110.

Figure 2:
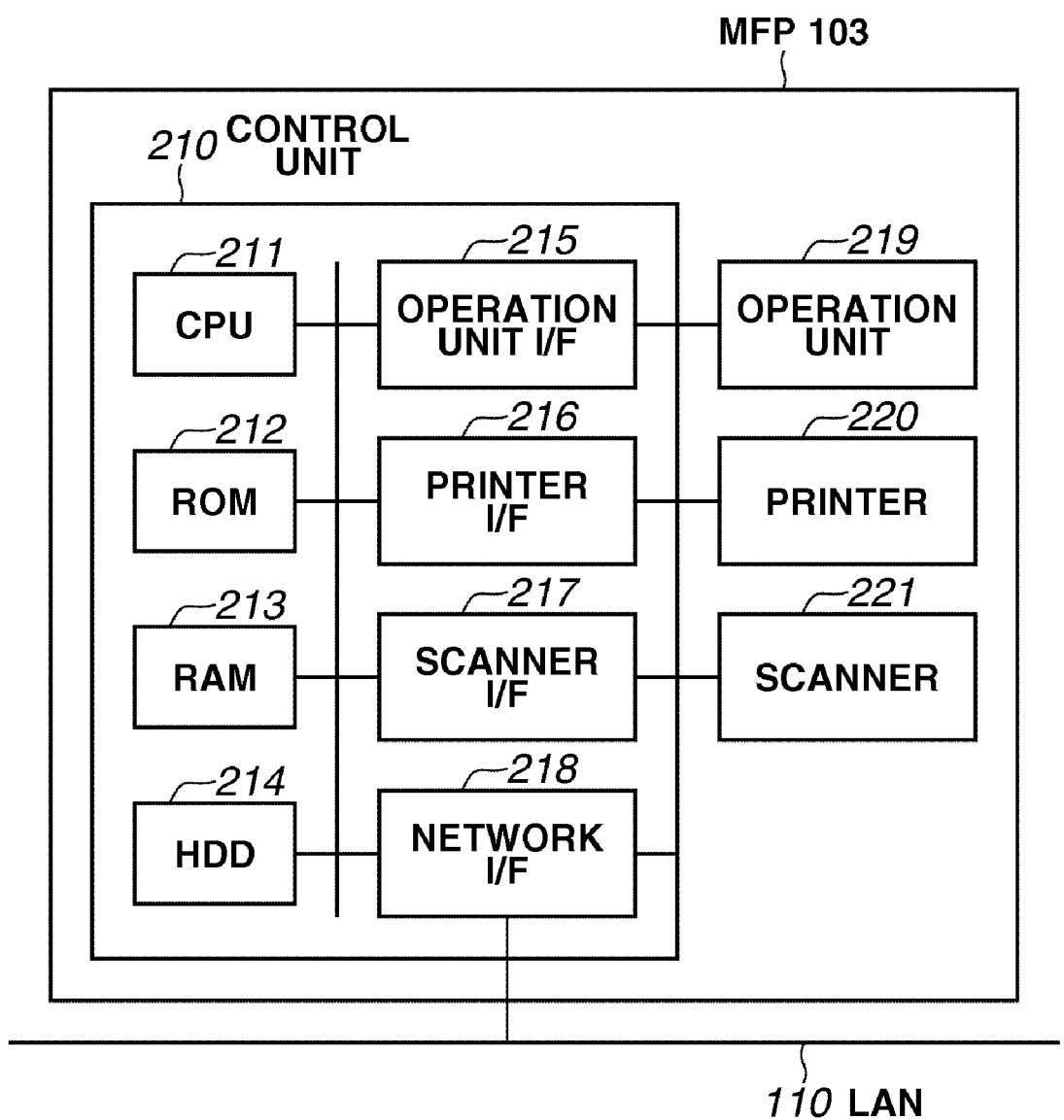
FIG. 2 illustrates an exemplary configuration of a multifunction peripheral (MFP) according to an exemplary embodiment of the present invention.

FIG. 2 is a block diagram illustrating an exemplary configuration of the MFP 103. Referring to FIG. 2, a control unit 210, which includes a central processing unit (CPU) 211, controls the operation of the entire MFP 103. The CPU 211 reads a control program stored on a read-only memory (ROM) 212 and executes various control processing, such as reading control and transmission control, based on the read control program.

A random access memory (RAM) 213 is used as a temporary storage area, such as a main memory or a work area, for the CPU 211. A hard disk drive (HDD) 214 stores image data, various programs, and various information tables. The information tables will be described in detail below.

An operation unit interface (I/F) 215 is an interface between an operation unit 219 and the control unit 210. The operation unit 219 includes a liquid crystal display (LCD) unit having a touch panel function and a keyboard.

A printer I/F 216 is an interface between a printer 220 and the control unit 210. Image data to be printed on the printer 220 is transferred from the control unit 210 to the printer 220 via the printer I/F 216. The printer 220 prints the received image data on a recording medium.

A scanner I/F 217 is an interface between a reading means in the form of a scanner 221 and the control unit 210. The scanner 221 reads an image of a document and generates image data based on the read document image. In addition, the scanner 221 inputs the generated image data to the control unit 210 via the scanner I/F 217.

A network I/F 218 is an interface between the control unit 210 (the MFP 103) and the LAN 110. The network I/F 218 transmits image data to and receives a variety of information from an external apparatus (e.g., the transmission server 104) on the LAN 110.

Figure 3:
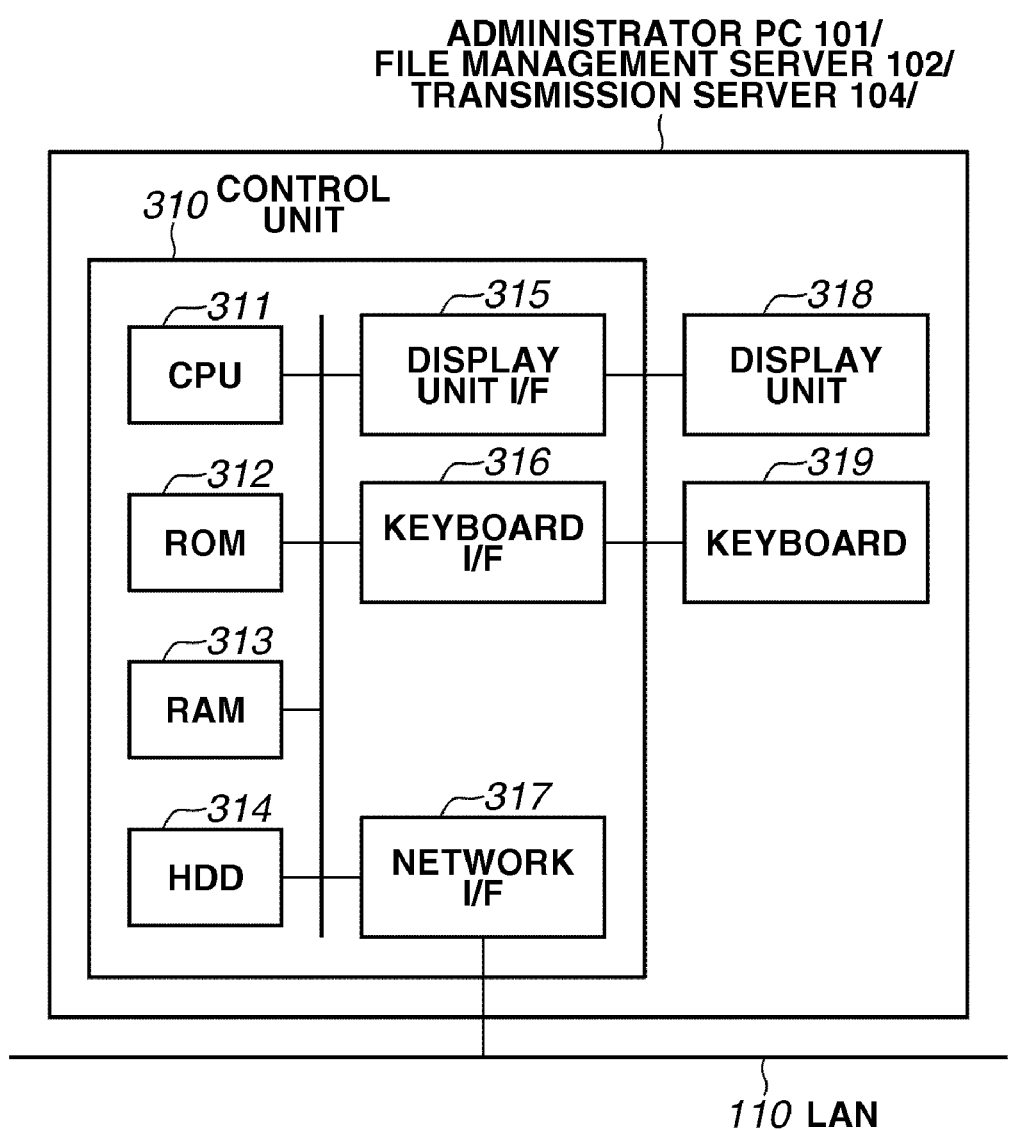
FIG. 3 illustrates an exemplary software configuration of an administrator personal computer (PC) according to an exemplary embodiment of the present invention.

FIG. 3 illustrates an exemplary configuration of the administrator PC 101. The file management server 102 and the transmission server 104 have a configuration similar to that of the administrator PC 101. Accordingly, the configuration of the administrator PC 101 will be primarily described in detail below as a typical computer.

Referring to FIG. 3, a control unit 310, which includes a CPU 311, controls the operation of the entire administrator PC 101. The CPU 311 reads a control program stored on a ROM 312 and executes various control processing based on the read control program.

A RAM 313 is used as a temporary storage area, such as a main memory or a work area, of the CPU 311. An HDD 314 stores image data, various programs, and various information tables. The information tables will be described in detail below.

A display unit I/F 315 is an interface between a display unit 318 and the control unit 310. A keyboard I/F 316 is an interface between a keyboard 319 and the control unit 310.

The CPU 311 receives a user instruction input via the keyboard 319 and changes a screen to be displayed on the display unit 318 according to the received user instruction.

A network I/F 317 is an interface between the control unit 310 (of the administrator PC 101) and the LAN 110. The network I/F 317 transmits and receives various information to and from other apparatuses on the LAN 110.

An operation of the entire image processing system will be described in detail below with reference to FIG. 4.

Figure 4:
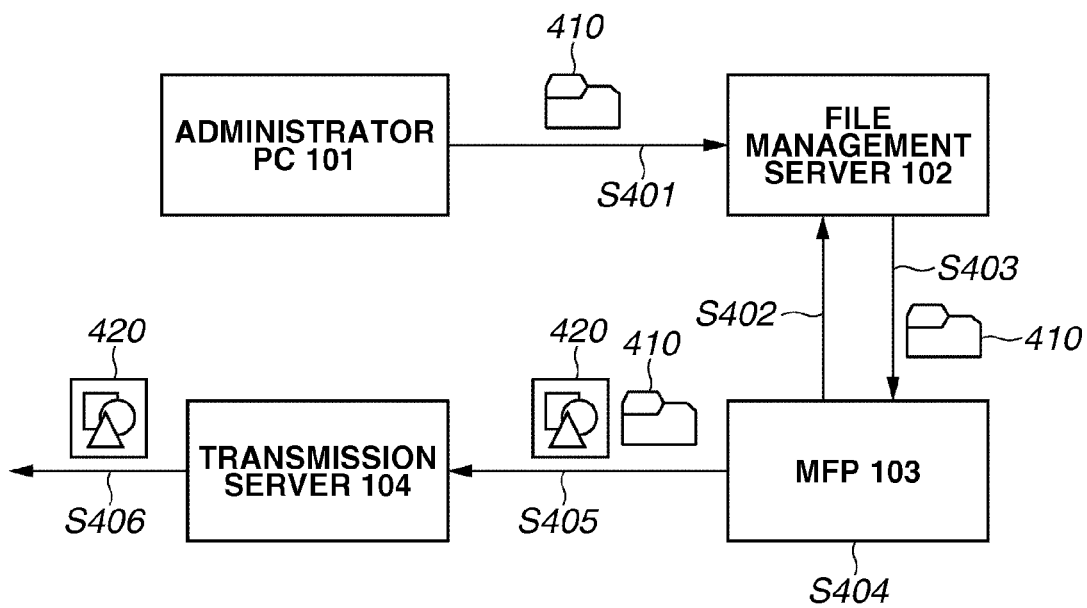
FIG. 4 schematically illustrates an exemplary operation of the entire image processing system according to an exemplary embodiment of the present invention.

Referring to FIG. 4, the user operates the administrator PC 101 to generate a plurality of process definition files 410. The process definition files 410 each include a definition for executing a series of processes by utilizing a plurality of functions of the MFP 103 and the transmission server 104. The user may also select one or more process definition files from process definition files previously generated and stored in the administrator PC 101.

In the present exemplary embodiment, it is supposed that the process definition files 410 each include a definition for instructing execution of a series of processes including causing the MFP 103 to read an image of a document and to generate image data based on the read document image and causing the transmission server 104 to transmit the generated image data to a predetermined transmission destination.

When the user inputs various processing contents (e.g., a reading parameter and a transmission destination) via a process definition file generation screen displayed on the administrator PC 101 to generate a plurality of process definition files, the flow of processing illustrated in FIG. 4 starts.

After the generation of the process definition files is completed, then in step S401, the administrator PC 101 transmits the generated process definition files 410 to the file management server 102 via the LAN 110. After receiving the process definition files 410 from the administrator PC 101, the file management server 102 registers and stores the received process definition files 410 in association with a user identification (ID).

If a user logs into the MFP 103 after that, then in step S402, the MFP 103 transmits the user ID, corresponding to the user who has logged in, to the file management server 102. Furthermore, the MFP 103 issues a request to the file management server 102 to transmit the process definition files corresponding to the user who has logged in.

In step S403, after receiving the request to transmit the process definition files from the MFP 103, the file management server 102 reads the process definition files 410 corresponding to the received user ID and transmits the read processing definition files 410 via the LAN 110 to the acquisition means (network interface means 218) of the MFP 103.

In step S404, after receiving the process definition files 410 from the file management server 102, the MFP 103 notifies the acquired process definition files 410 to the user and receives a user selection of one or more of the process definition files 410. In addition, the CPU 211 of the MFP 103 causes the scanner 221 to execute reading processing according to the definition included in the process definition files selected by the user.

In step S405, the MFP 103 transmits the generated image data 420 and the selected process definition files 410 to the transmission server 104 via the network interface means. In addition, the MFP 103 requests the transmission server 104 transmit the image data.

In step S406, the transmission server 104 transmits the image data 420 via e-mail or using an FTP protocol according to the definition included in the relevant process definition file 410.

With the above-described configuration, the present exemplary embodiment can save the user from having to execute complicated operations for designating a reading parameter and a transmission destination every time the user causes the MFP 103 to read a document. In addition, the present exemplary embodiment having the above-described configuration can prevent the user of the MFP 103 from executing processing that the administrator of the system does not intend to allow the user to execute, by inhibiting the user of the MFP from modifying or changing the content designated by the administrator in generating the process definition file on the administrator PC 101.

FIG. 5 illustrates a specific example of a description included in a process definition file 410 registered on the file management server 102. In the example illustrated in FIG. 5, the process definition file is described in the extended Markup Language (XML) format. However, the present exemplary embodiment is not limited to this format. Furthermore, each process defined in the process definition file is described as an XML tag and the processes are executed in order of the descriptions included in the process definition file.

Referring to FIG. 5, a tag 501 indicates that the processing is a single integrated process including a combination of a plurality of processes. The tag 501 includes a process ID, which uniquely identifies the process definition file ("0001" in the example illustrated in FIG. 5), and the name of the process ("scan and send to division manager by e-mail" in the example illustrated in FIG. 5).

A tag 502 defines processing for reading an image of a document by using the scanner 221 and generating image data based on the read document image. A tag 503 defines an instruction for generating gray scale image data when the scanner reads the image of the document.

A tag 504 defines an instruction for transmitting the image data by e-mail. A tag 505 describes the e-mail address of a transmission destination of the image data (manager@xxxx.xxxx in the example illustrated in FIG. 5).

Figure 6:
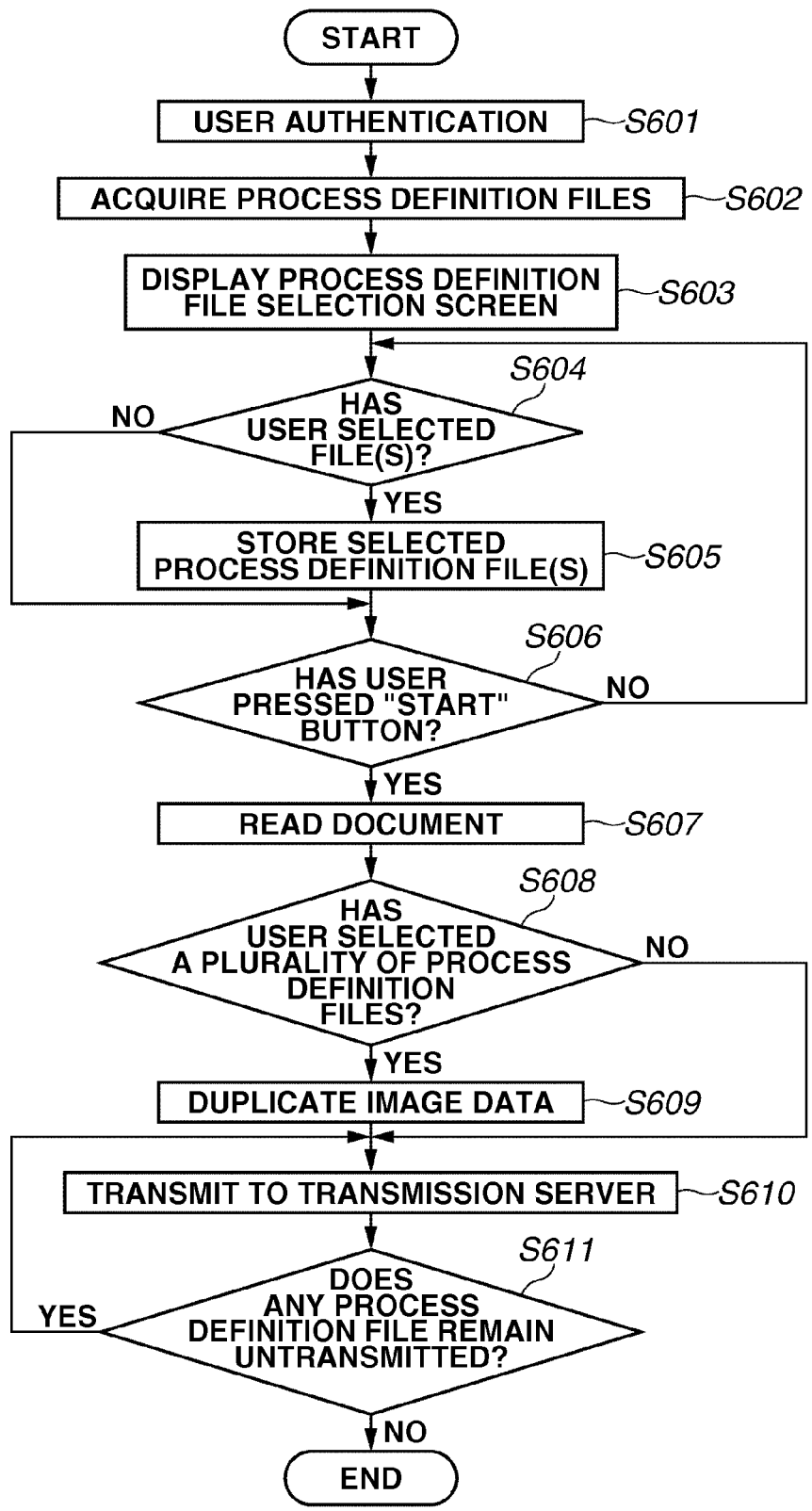
FIG. 6 is a flow chart illustrating an exemplary operation of the MFP according to an exemplary embodiment of the present invention.

FIG. 6 is a flow chart illustrating an example of a series of processes executed by the MFP 103 for generating image data according to one of the selected process definition files and requesting the transmission server 104 to transmit the image data. Each process illustrated in the flow chart of FIG. 6 is implemented by the CPU 211 of the MFP 103 by executing the control program.

Referring to FIG. 6, in step S601, the CPU 211 authenticates the user of the MFP 103. More specifically, the CPU 211 displays an authentication information input screen for inputting authentication information on the operation unit 219. Furthermore, the CPU 211 collates the authentication information input via the authentication information input screen with previously stored authentication information to authenticate the user.

For authenticating the user, any publicly known method such as a method for reading and inputting authentication information stored on an ID card or a method for authenticating the user by using biometric information can be used.

Once the user has been authenticated in step S601, then the processing advances to step S602. In step S602, the CPU 211 issues a request to transmit the process definition files to the file management server 102. More specifically, the CPU 211 transmits the user ID of the authenticated user to the file management server 102.

After receiving the process definition files, corresponding to the user ID of the authenticated user, transmitted from the file management server 102 via the network interface means 218, then in step S603, the CPU 211 displays a file selection screen for allowing the user to select a desired process definition file.

Figure 7:
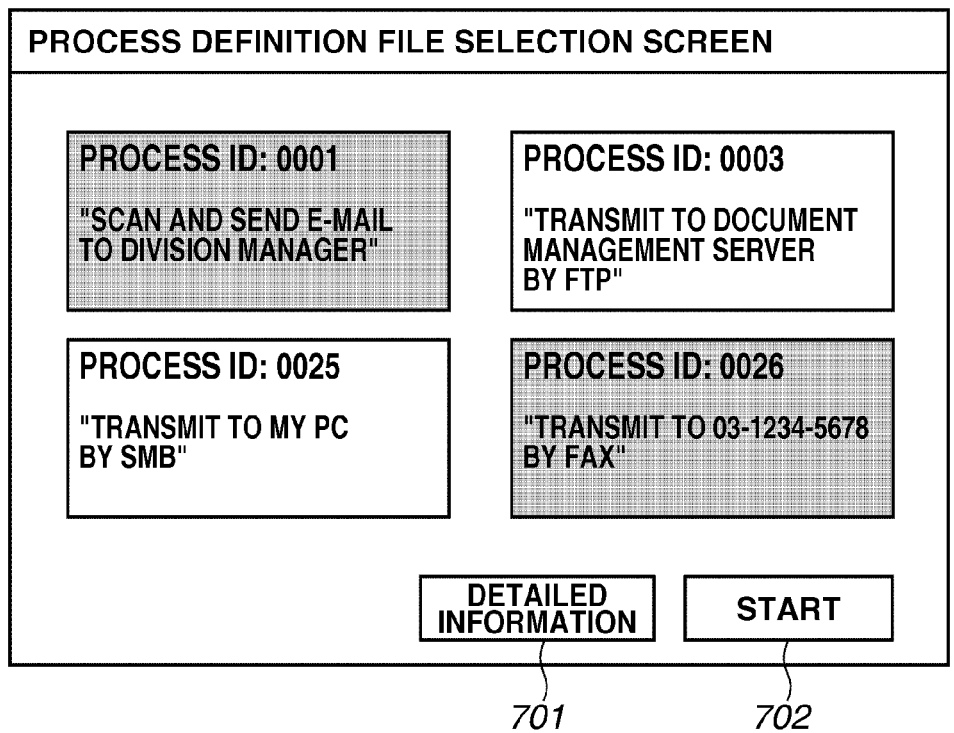
FIG. 7 illustrates an example of a screen displayed on the MFP according to an exemplary embodiment of the present invention.

FIG. 7 illustrates an example of the file selection screen, via which the user can select a process definition file. Referring to FIG. 7, when a plurality of process definition files is acquired in step S603, the CPU 211 displays the process definition files on the file selection screen in e.g. a list format.

The user can select a process definition file by touching on the touch panel in a display area displaying a desired process definition file according to information displayed on the file selection screen.

When the user selects a process definition file, the selected process definition file displayed in the touched display area is displayed in a different display state to the unselected process definition file(s). Thus, the user can easily recognize the selected file(s).

In the example of the screen illustrated in FIG. 7, a process definition file having a process ID "0001" and another process definition file having a process ID "0026" have been selected and are thus represented in a different colour.

A "detailed information" button 701 can be operated to issue an instruction for displaying detailed information about the currently selected process definition file(s). When the user presses the "detailed information" button 701, detailed information about the selected process definition file(s) (e.g., the specific content of the definition of the reading processing and transmission processing described in the process definition file(s)) is displayed.

In step S604, the CPU 211 determines whether the user has selected one or more process definition files according to the instruction from the user via the file selection screen. If it is determined that one or more process definition files have been selected (YES in step S604), then the processing advances to step S605. In step S605, the CPU 211 stores the selected process definition file(s) in a storage area for storing transmission target data (hereinafter simply referred to as a "transmission storage area").

It is also useful, in step S605, to store information about the selected process definition file(s) on the transmission storage area instead of storing the entity of the selected process definition file.

In step S606, the CPU 211 determines whether the user has pressed a "start" button 702 illustrated in FIG. 7. If it is determined that the user has pressed the "start" button 702 (YES in step S702), then the processing advances to step S607. On the other hand, if it is determined that the user has not pressed the "start" button 702 (NO in step S702), then the processing returns to step S604. In step S604, the CPU 211 determines whether the user has selected a process definition file again.

More specifically, in the present exemplary embodiment, the user can press the "start" (start transmission) button 702 in a state in which a plurality of process definition files have been selected. Accordingly, the user can instruct the execution of the selected plurality of process definition files at a time in one operation. The user cannot press the "start" button 702 in a state in which no process definition file has been selected.

In step S607, the CPU 211 causes the scanner 221 to execute reading processing and generate image data according to the definition described in the selected process definition file(s). In this instance, if a plurality of process definition files are selected, the process definition files are supposed to have the same content of reading processing.

In step S608, the CPU 211 determines whether a plurality of process definition files were stored on the transmission storage area in step S605 (i.e., whether the user has selected a plurality of process definition files).

If it is determined that the user has selected a plurality of process definition files (YES in step S608), then the processing advances to step S609. In step S609, the CPU 211 executes control for duplicating the image data generated in the reading processing in step S607 so as to generate a number of pieces or items of image data corresponding to the number of the selected process definition files, in other words a copy of the image data is generated for each selected process definition file.

It is also useful, in the duplication processing in step S609, to change the resolution and the size of the image data according to the definition described in each of the selected plurality of process definition files as well as generating the duplicated pieces of image data.

In step S610, the control unit 210 associates one of the selected process definition files with one piece of image data, from among the pieces of image data generated by the duplication processing in step S609, and transmits the mutually associated process definition file and image data to the transmission server 104. Furthermore, the CPU 211 requests the transmission server 104 to transmit the image data.

On the other hand, if it is determined that the user has not selected a plurality of process definition files (NO in step S608), then the processing advances to step S610 without duplicating the image data. In step S610, the CPU 211 associates one piece of image data with the selected one process definition file and transmits the mutually associated image data and process definition file to the transmission server 104.

In step S611, the CPU 211 determines whether there is any remaining process definition file, of the selected process definition files, which has not yet been transmitted to the transmission server 104. If it is determined that a process definition file that has not yet been transmitted to the transmission server 104 remains (YES in step S610), then the processing returns to step S610 and repeats the above-described processing until all process definition files and their associated image data have been transmitted to the transmission server. The processing files and associated image data are thus transmitted individually to the transmission server 104.

The processing ends when it is determined that no process definition file that has not been transmitted to the transmission server 104 remains (NO in step S611).

Figure 8:
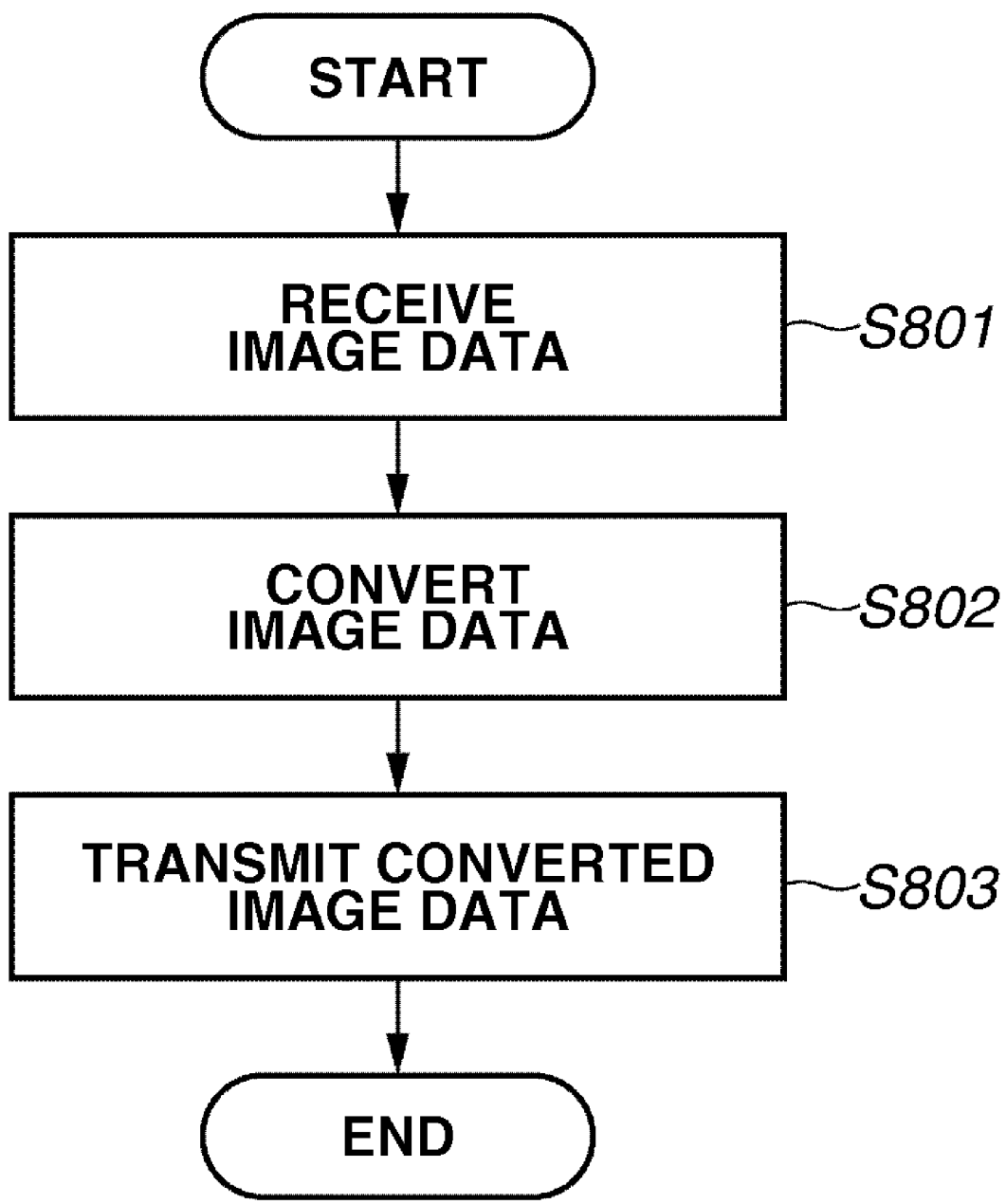
FIG. 8 is a flow chart illustrating an exemplary operation executed by a transmission server according to an exemplary embodiment of the present invention.

FIG. 8 is a flow chart illustrating an example of processing executed by the transmission server 104 when the MFP 103 has issued a request to transmit image data. Each process illustrated in the flow chart of FIG. 8 is implemented by the CPU 311 of the transmission server 104 by executing the control program.

Referring to FIG. 8, in step S801, the CPU 311 receives transmission target image data from the MFP 103. In step S802, the CPU 311 analyzes the description in the process definition file received together with the image data in step S801. In addition, the CPU 311 converts the image data according to the content of the process definition file.

In the present exemplary embodiment, if the definition included in the process definition file defines processing for transmitting the image data by e-mail, then the CPU 311 executes processing for converting the format of the received image data into a format appropriate for transmission by e-mail.

Alternatively, if the definition included in the processing for defines processing for transmitting the image data by facsimile, then the CPU 311 executes processing for converting the format of the received image data into a format appropriate for transmission by facsimile.

In step S803, the CPU 311 transmits the converted image data according to the content of the transmission processing definition included in the process definition file. The steps S801 to S803 are then repeated for each process definition file, with accompanying image data, which the transmission server 104 receives.

With the above-described configuration, when the user has instructed the execution of the selected plurality of process definition files, the present exemplary embodiment can cause the transmission server 104 to transmit the generated image data according to the definition included in each of the respective selected plurality of process definition files.

In particular, if the user has selected a plurality of process definition files, the present exemplary embodiment duplicates the image data generated by one reading operation by the CPU 211, rather than having to repeat the reading operation. The present exemplary embodiment also causes the transmission server 104 to transmit the plurality of pieces of image data generated by the duplication individually or one by one.

With the above-described configuration, the present exemplary embodiment can execute a plurality of process definition files at a time in one operation without executing reading processing a plurality of times for generating the same image data.

A second exemplary embodiment of the present invention will now be described in detail below.

In the above-described first exemplary embodiment, if the user selects a plurality of process definition files at the same time, the MFP 103 duplicates image data that has been generated by one reading operation, associates one piece of image data generated by the duplication with one process definition file, and transmits the mutually associated one piece of image data and one process definition file to the transmission server 104.

In the second exemplary embodiment, the MFP 103 transmits one piece of image data generated by one reading operation and a plurality of process definition files to the transmission server 104 at a time in one transmission operation.

Figure 9:
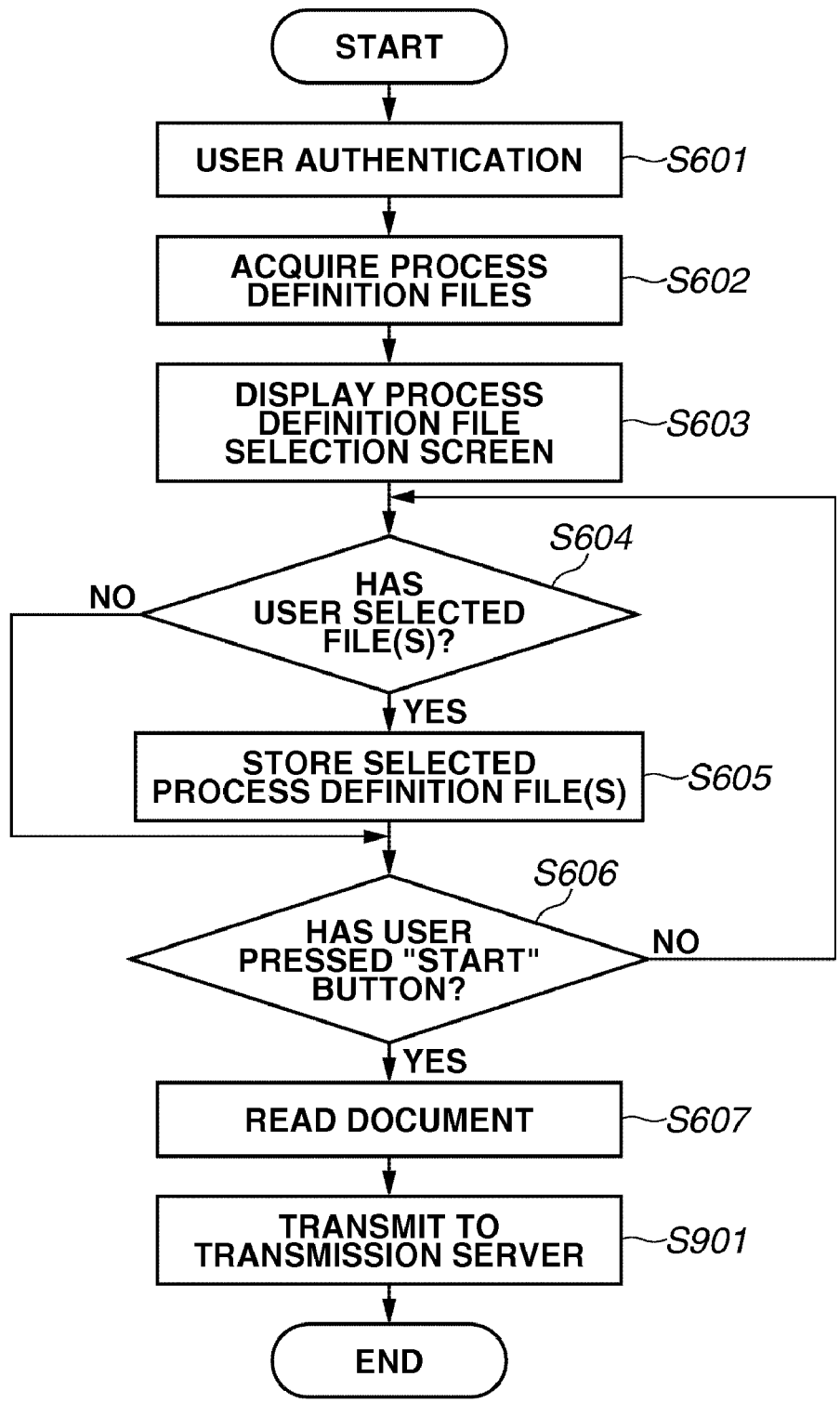
FIG. 9 is a flow chart illustrating an exemplary operation of the MFP according to an exemplary embodiment of the present invention.

FIG. 9 is a flow chart illustrating an example of a series of processes executed by the MPU 103 for generating image data according to the selected process definition file and requesting the transmission server 104 to transmit the image data. Each process illustrated in the flow chart of FIG. 9 is implemented by the CPU 211 of the MFP 103 by executing the control program.

In the example illustrated in FIG. 9, the processes in steps S601 through S607 are similar to that described above in the first exemplary embodiment with reference to the flow chart of FIG. 6. Accordingly, the description thereof will not be repeated here.

Referring to FIG. 9, in step S901, the CPU 211 transmits one piece of image data generated by the reading processing in step S607 (FIG. 6) and one or a plurality of process definition files selected by the user in step S604 (FIG. 6) to the transmission server 104 at a time in one transmission operation.

Figure 10:
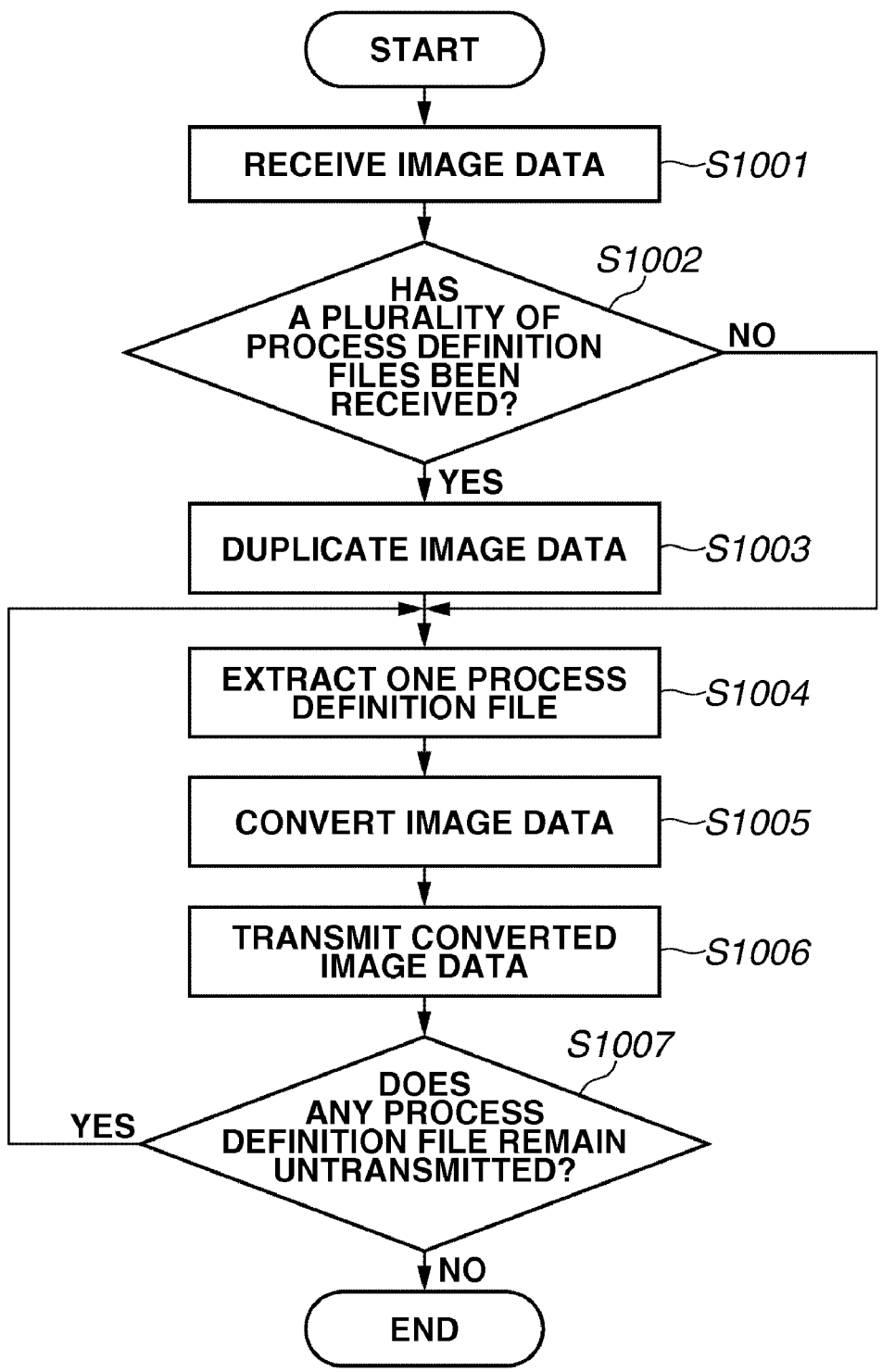
FIG. 10 is a flow chart illustrating an exemplary operation executed by the transmission server according to an exemplary embodiment of the present invention.

FIG. 10 is a flow chart illustrating an example of processing executed by the transmission server 104 when the MFP 103 has requested the transmission of image data. Each process illustrated in the flow chart of FIG. 10 is implemented by the CPU 311 of the transmission server 104 by executing the control program.

Referring to FIG. 10, in step S1001, the CPU 311 receives transmission image data from the MFP 103. In step S1002, the CPU 311 determines whether a plurality of process definition files has been received from the MFP 103.

If it is determined that a plurality of process definition files has been received from the MFP 103 (YES in step S1002), then the processing advances to step S1003. In step S1003, the CPU 311 duplicates the image data received in step S1001 and generates a number of pieces of image data corresponding to the number of the process definition files received in step S1002.

In step S1004, the CPU 311 extracts one process definition file from the received plurality of process definition files. In step S1005, the CPU 311 analyzes the description included in the extracted process definition file and converts the image data according to the content of the process definition file.

In step S1006, the CPU 311 instructs the transmission of the image data, converted according to the content of the process definition file, via network interface means 317. In step S1007, the CPU 311 determines whether all the process definition files received in step S1001 have been processed. More specifically, in step S1007, the CPU 311 determines whether any unprocessed process definition files remain.

If it is determined that an unprocessed process definition file remains (NO in step S1007), then the CPU 311 returns to step S1004 and repeats the processing in step S1004 and subsequent steps. On the other hand, if it is determined that all the process definition files received in step S1001 have been processed (YES in step S1007), then the processing ends.

As described above, if the user instructs the execution of the selected plurality of process definition files, the present exemplary embodiment can cause the transmission server 104 to transmit the generated image data according to the definition included in each of the selected plurality of process definition files.

In particular, in the present exemplary embodiment, if the user selects a plurality of process definition files at the same time, the MFP 103 transmits one piece of image data generated by one reading operation by the CPU 211 and a plurality of process definition files to the transmission server 104 at a time in one transmission operation.

With the above-described configuration, the present exemplary embodiment can reduce the processing load on the MFP 103 for executing image data duplication processing without requiring the MFP 103 to read the same image data a plurality of times. In addition, the present exemplary embodiment having the above-described configuration can alleviate the network traffic by reducing the total amount of data to be transmitted from the MFP 103 to the transmission server 104.

A third exemplary embodiment of the present invention will be described in detail below. In the above-described first exemplary embodiment, when the user has selected a plurality of process definition files, the MFP 103 duplicates the image data generated by one reading operation, associates each piece of image data generated by the duplication with one of the selected process definition files, and transmits the mutually associated one piece of image data and one process definition file to the transmission server 104.

In the above-described second exemplary embodiment, the MFP 103 transmits one piece of image data generated by one reading operation and a plurality of process definition files to the transmission server 104 in a single transmission operation.

In the third exemplary embodiment, the MFP 103 is configured to perform either the processing described above in the first exemplary embodiment or that described above in the second exemplary embodiment according to the capacity of the transmission server 104.

Figure 11:
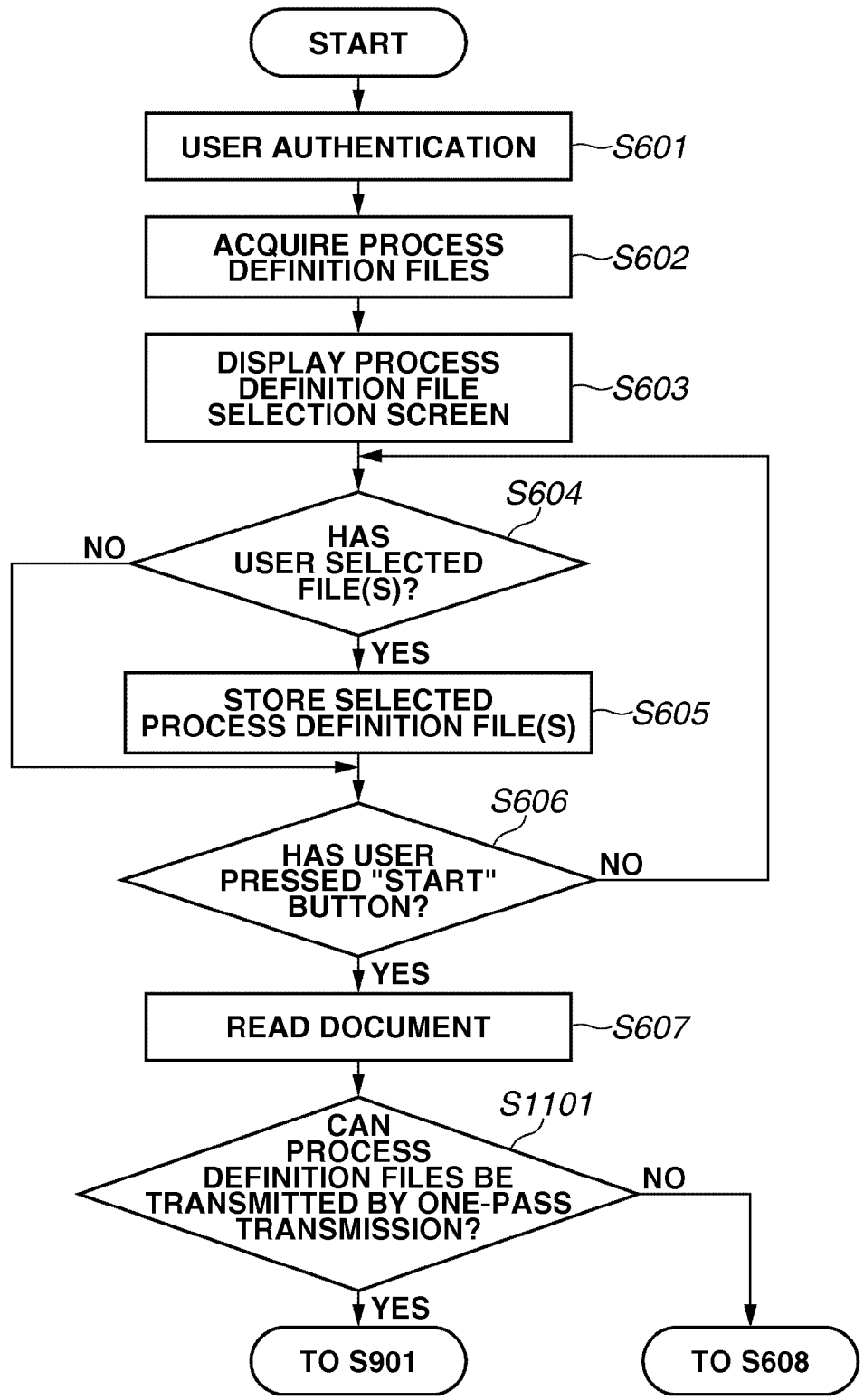
FIG. 11 is a flow chart illustrating an exemplary operation of the MFP according to an exemplary embodiment of the present invention.

FIG. 11 is a flow chart illustrating an example of a series of processes executed by the MFP 103 for generating image data according to the selected process definition file and requesting the transmission server 104 to transmit the image data. Each process illustrated in the flow chart of FIG. 11 is implemented by the CPU 211 of the MFP 103 by executing the control program.

In the example illustrated in FIG. 11, the processing in steps S601 through S607 is similar to that described above in the first exemplary embodiment with reference to the flow chart of FIG. 6. Accordingly, the description thereof will not be repeated here.

Referring to FIG. 11, in step S1101, the CPU 211 determines whether a plurality of process definition files can be transmitted to the transmission server 104 at a time in one operation. If the transmission server 104 has a capacity to execute the processing illustrated in FIG. 10, then the CPU 211 determines that a plurality of process definition files can be transmitted to the transmission server 104. On the other hand, if the transmission server 104 does not have a capacity to execute the processing illustrated in FIG. 10 and is only capable of executing the processing illustrated in FIG. 8, then the CPU 211 determines that a plurality of process definition files cannot be transmitted to the transmission server 104.

If it is determined that the plurality of selected process definition files can be transmitted to the transmission server 104 in a single transmission operation (YES in step S1101), then the processing advances to step S901 (FIG. 9). On the other hand, if it is determined that the plurality of process definition files cannot be transmitted to the transmission server 104 in one single transmission operation (NO in step S1101), then the processing advances to step S608 (FIG. 6).

In the present exemplary embodiment, the MFP 103 executes the determination in step S1101 in the following manner. After executing the reading process in step S607 (FIG. 6), the MFP 103 communicates with the transmission server 104 to acquire information about the capacity of the transmission server 104. The MFP 103 executes the determination in step S1101 according to the acquired information about the capacity of the transmission server 104. However, the present exemplary embodiment is not limited to this.

For example, the MFP 103 may have previously communicated with the transmission server 104 to acquire information about the capacity of the transmission server 104. The MFP 103 preferably stores the acquired information about the capacity of the transmission server 104 on the memory of the MFP 103. In this case, after executing the reading processing in step S607 (FIG. 6), the MFP 103 reads the information from the memory and executes the determination in step S1101 according to the read capacity information.

Alternatively, when generating a process definition file on the administrator PC 101, information about the capacity of the transmission server 104 to be used in the processing may be described in the process definition file. In this case, the MFP 103 analyzes the content of the definition included in the process definition file to recognize the capacity of the transmission server 104 and executes the determination in step S1101 according to the information about the capacity of the transmission server 104 acquired in the above-described manner.

As described above, the present exemplary embodiment selects the method for requesting the transmission server 104 to transmit image data in accordance with the result of the determination as to whether a plurality of process definition files can be transmitted to the transmission server 104 in one transmission operation.

According to the present exemplary embodiment having the above-described configuration, the MFP 103 can transmit the image data and the process definition file to the transmission server 104 by the method determined according to and appropriate for the capacity of the transmission server 104.

A fourth exemplary embodiment of the present invention will be described in detail below.

In the fourth exemplary embodiment, as well as selecting the method for requesting the transmission server 104 to transmit image data according to a result of the determination as to whether a plurality of process definition files can be transmitted to the transmission server 104 in one operation, the MFP 103 also executes processing for combining process definition files into one file.

Figure 12:
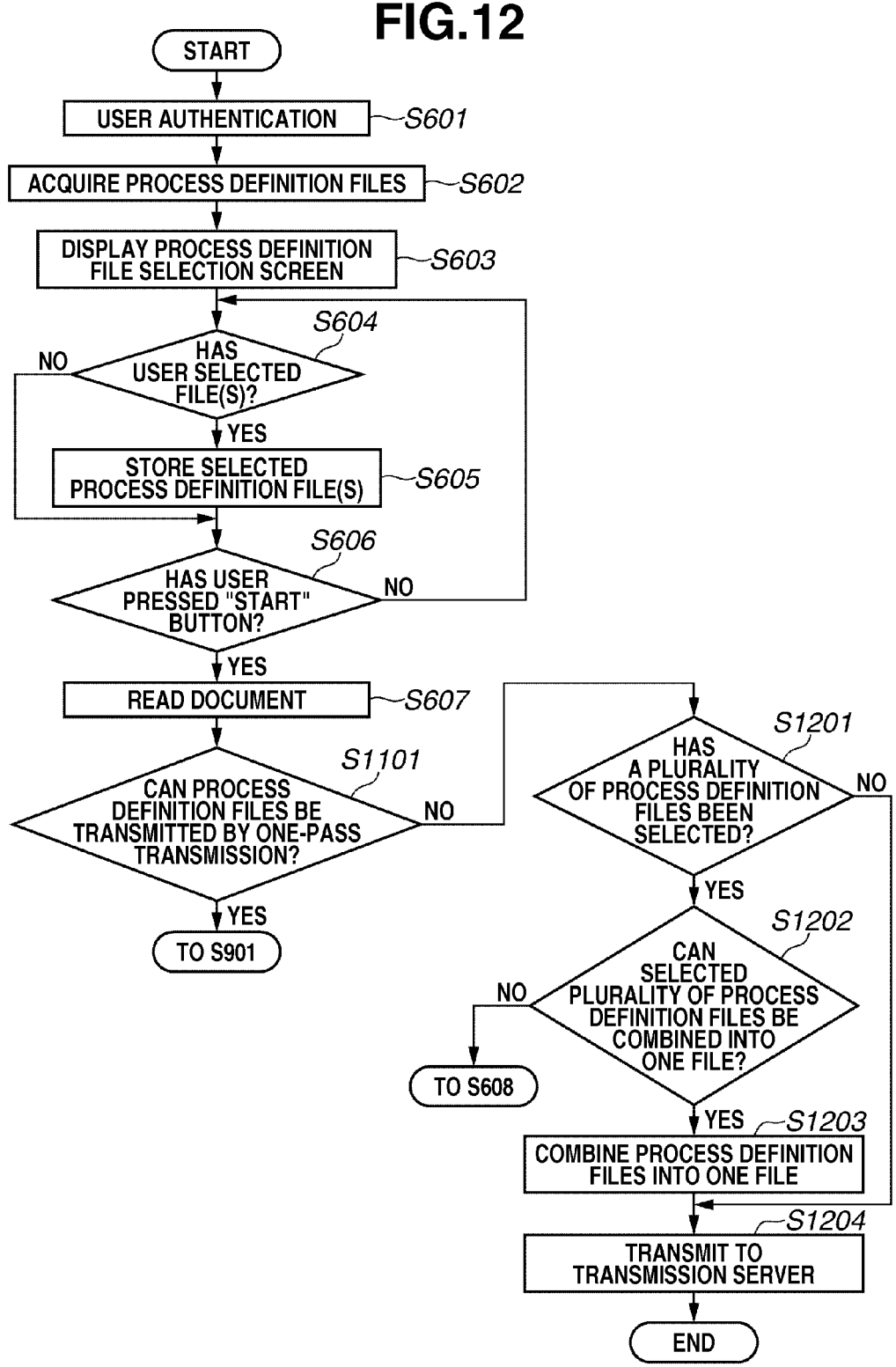
FIG. 12 is a flow chart illustrating an exemplary operation of the MFP according to an exemplary embodiment of the present invention.

FIG. 12 is a flow chart illustrating an example of a series of processes executed by the MFP 103 for generating image data according to the selected process definition file and requesting the transmission server 104 to transmit the image data. Each process illustrated in the flow chart of FIG. 12 is implemented by the CPU 211 of the MFP 103 by executing the control program.

In the example illustrated in FIG. 12, the processes in steps S601 through S607 are similar to that described above in the first exemplary embodiment with reference to the flow chart of FIG. 6. Accordingly, the description thereof will not be repeated here. Furthermore, in the example illustrated in FIG. 12, the processing in step S1101 is the same as that in performed in step S1101 described above with reference to FIG. 11. Accordingly, the description thereof will not be repeated here.

Referring to FIG. 12, in step S1201, the CPU 211 determines whether a plurality of process definition files were stored on the transmission storage area in step S605 (FIG. 6). In other words, in step S1201, the CPU 211 determines whether the user has selected a plurality of process definition files. If it is determined that the user has selected a plurality of process definition files (YES in step S1201), then the processing advances to step S1202.

In step S1202, the CPU 211 determines whether the selected plurality of process definition files can be combined into one file. If the definitions included in the selected process definition files have the same content of reading processing, then the CPU 211 determines that the selected plurality of process definition files can be combined into one file.

If it is determined that the selected plurality of process definition files can be combined into one file (YES in step S1202), then the processing advances to step S1203. In step S1203, the CPU 211 combines the selected plurality of process definition files into one process definition file.

The processing for combining the selected plurality of process definition files into one file will be described in detail below.

FIG. 13 illustrates a specific example of a description included in a process definition file 1300. In the example illustrated in FIG. 13, the CPU 211 combines the process definition file 410 (FIG. 5) with the process definition file 1300. The process definition file 1300 has the same content as that of the process definition file 410 except for a tag 1301.

In the above-described process definition file 410, a description "manager@xxxx.xxxx" is included as the transmission destination of the image data. In the process definition file 1300, a description "user_pc@xxxx.xxxx" is included as the transmission destination of the image data.

FIG. 14 illustrates a specific example of a process definition file 1400, which is generated by combining the process definition file 410 (FIG. 5) with the process definition file 1300 (FIG. 13).

Referring to FIG. 14, as the process definition file 410 has been combined with the process definition file 1300, a tag 1402 included in the process definition file 1400 integrally includes both the e-mail addresses included in the process definition file 410 and the process definition file 1300.

After receiving the process definition file including the above-described content, the transmission server 104 executes processing for transmitting the image data to each e-mail address.

In the example illustrated in FIG. 14, a null value ("-") is described in a tag 1401 as the process ID of the process definition file 1400. However, the present exemplary embodiment is not limited to this. More specifically, it is also useful if either one of the process IDs of the process definition file 410 and the process definition file 1300 is used as the process ID of the process definition file 1400.

Referring back to FIG. 12, in step S1204, the CPU 211 associates the image data generated by the reading process in step S607 with the process definition file generated by the combination processing in step S1203. Then, the CPU 211 transmits the mutually associated image data and process definition file to the transmission server 104.

On the other hand, if it is determined that the user has not selected a plurality of process definition files (NO in step S1201), then the processing advances to step S1204 without executing the above-described combination processing.

In this case, in step S1204, the CPU 211 associates the image data generated by the reading process in step S607 with the process definition file selected in step S604. Then, the CPU 211 transmits the mutually associated image data and process definition file to the transmission server 104.

If it is determined that the selected plurality of process definition files cannot be combined into one process definition file (NO in step S1202), then the processing advances to step S608.

As described above, in the present exemplary embodiment, if it is determined that a plurality of process definition files cannot be transmitted to the transmission server 104 in one transmission operation, then the CPU 211 further determines whether the selected plurality of process definition files can be combined into one process definition file. If it is determined that the selected plurality of process definition files can be combined into one process definition file, then the CPU 211 executes process definition file combination processing.

According to the present exemplary embodiment having the above-described configuration, the MFP 103 may not need to duplicate image data even if a plurality of process definition files cannot be transmitted to the transmission server 104 in one transmission operation.

Furthermore, with the above-described configuration, the present exemplary embodiment can prevent an increase in the network traffic that may otherwise occur if the same image data is transmitted in duplicate.

A fifth exemplary embodiment of the present invention will be described in detail below. In the present exemplary embodiment, when the user has selected a plurality of process definition files, the CPU 211 divides the selected plurality of process definition files into groups and executes one reading operation for each group.

FIG. 15 is a flow chart illustrating an example of a series of processes executed by the MFP 103 for generating image data according to a selected process definition file and requesting the transmission server 104 to transmit the image data. Each process illustrated in the flow chart of FIG. 15 is implemented by the CPU 211 of the MFP 103 by executing the control program.

In the example illustrated in FIG. 15, the processes in steps S601 through S606 are similar to that described above in the first exemplary embodiment with reference to the flow chart of FIG. 6. Accordingly, the description thereof will not be repeated here.

Referring to FIG. 15, in step S1501, the CPU 211 determines whether a plurality of process definition files have been stored on the transmission storage area in step S605. In other words, in step S1501, the CPU 211 determines whether the user has selected a plurality of process definition files.

If it is determined that the user has selected a plurality of process definition files (YES in step S1501), then the processing advances to step S1502. In step S1502, the CPU 211 divides the selected plurality of process definition files into a plurality of groups.

In the process definition file grouping process in step S1502, one group includes the process definition files having the same content of reading processing. More specifically, the process definition files having the definition of the instruction for executing the same reading processing are grouped into one group while the process definition files having a different content of reading processing are grouped into another group.

As a result of the grouping in step S1502, it is possible that only one group is formed. Namely, if the content of the reading processing defined in all of the selected process definition files is the same, then the CPU 211 forms one group including all of the selected process definition files. In this case, only one group is formed.

Furthermore, as a result of the grouping in step S1502, a group may include only one process definition file or may include a plurality of process definition files.

In step S1503, the CPU 211 extracts one group generated by the grouping process in step S1502. In step S1504, the CPU 211 causes the scanner 221 to execute the reading processing according to the content of the definition included in the process definition file or files included in the group extracted in step S1503. Furthermore, the CPU 211 causes the scanner 221 to generate image data according to the definition included in the process definition file.

In step S1505, the CPU 211 transmits the image data generated by the reading processing in step S1504 and the process definition file or files included in the group extracted in step S1503 to the transmission server 104 in a single transmission operation.

After receiving the image data and the process definition file from the MFP 103, the transmission server 104 executes a series of processes as illustrated in FIG. 10.

In step S1506, the CPU 211 determines whether any group, of the groups generated by the grouping processing in step S1502, which has not yet been subjected to processing in steps S1503 through S1505 remains. If it is determined that one or more unprocessed groups remain (YES in step S1506), then the processing returns to step S1503 and repeats the process in step S1503 and subsequent steps. On the other hand, if it is determined that no unprocessed group remains (i.e., that all of the groups have been processed) (NO in step S1506), then the processing ends.

If it is determined in S1501 that the user has not selected a plurality of process definition files (NO in step S1501), then the processing advances to step S1507.

In step S1507, the CPU 211 causes the scanner 221 to execute the reading processing according to the content of the definition included in the selected process definition file to generate image data according to the definition included in the process definition file.

In step S1508, the CPU 211 associates the image data generated by the reading process in step S1507 with the process definition file selected in step S604. Then, the CPU 211 transmits the mutually associated image data and process definition file to the transmission server 104. Then, the processing ends.

As described above, in the fifth exemplary embodiment, the CPU 211 executes reading processing using the scanner 221 for each group of process definition files.

With the above-described configuration, the present exemplary embodiment can execute a plurality of process definition files in one operation even if the MFP 103 does not include the function for converting the resolution and the size of image data as executed in step S609 (FIG. 6) or if the image quality may degrade by the image processing.

A sixth exemplary embodiment of the present invention will be described in detail below. In the present exemplary embodiment, if the user selects one process definition file, the CPU 211 inhibits (restricts) the user from selecting another process definition file, which cannot be selected simultaneously with the selected one file.

FIG. 16 is a flow chart illustrating an example of a series of processes executed by the MFP 103 for generating image data according to the selected process definition file and requesting the transmission server 104 to transmit the image data. Each process illustrated in the flow chart of FIG. 16 is implemented by the CPU 211 of the MFP 103 by executing the control program.

In the example illustrated in FIG. 16, the processes in steps S601 through S606 are similar to that described above in the first exemplary embodiment with reference to the flow chart of FIG. 6. Accordingly, the description thereof will not be repeated here.

Referring to FIG. 16, in step S1601, the CPU 211 identifies a process definition file, from the process definition files acquired in step S602 (FIG. 6), which cannot be simultaneously selected with the process definition file selected in step S604 (FIG. 6) (hereinafter simply referred to as a "simultaneous selection-inhibited process definition file").

In the present exemplary embodiment, the "simultaneous selection-inhibited process definition file" refers to a process definition file in which the content of the reading processing defined therein is different from the content of the reading processing defined in the process definition file selected in step S604 (FIG. 6).

More specifically, in the present exemplary embodiment, if a plurality of process definition files includes definitions for generating different pieces of image data, it becomes necessary to execute reading operations a plurality of times. Accordingly, the user is inhibited from simultaneously selecting process definition files having definitions for generating different pieces of image data.

Figure 17:
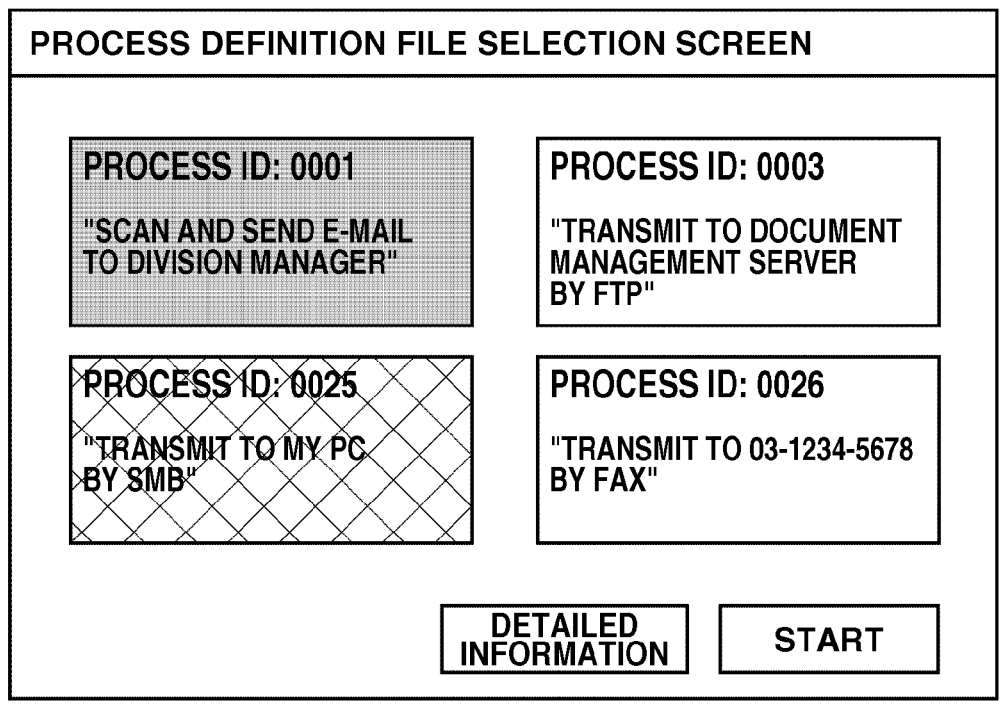
FIG. 17 illustrates an example of a screen displayed on the MFP according to an exemplary embodiment of the present invention.

In step S1602, the CPU 211 executes control for inhibiting (restricting) the user from selecting the process definition file identified in step S1601. More specifically, the CPU 211 displays a display area corresponding to a process definition file having a process ID "0025", as illustrated in a file selection screen in FIG. 17, in a state different to that of the selected process definition file (ID 0001). The user cannot select the process definition file (ID 0025) corresponding to the shaded or hatched display area even when the user touches the portion of the screen corresponding to the shaded or hatched display area.

In the present exemplary embodiment, the user cannot simultaneously select process definition files where the contents of reading processing are different from one another. However, this does not apply if the MFP 103 includes the function for converting the resolution and the size of the image data in duplicating the image data as executed in step S609 (FIG. 6).

More specifically, if the MFP 103 can perform one reading operation and generate image data according to the definitions included in each of the selected plurality of process definition files by converting the resolution and the size of the image data generated by the reading process, it is preferable to allow the user to simultaneously select a plurality of process definition files having different contents of reading processing.

As described above, the sixth exemplary embodiment inhibits (prevents) the user from selecting a combination of a plurality of process definition files in one selection operation that may require the execution of a plurality of reading operations.

In the present exemplary embodiment, the user is inhibited from selecting a combination of a plurality of process definition files in one selection operation where the plurality of process definition files require the execution of a plurality of reading operations as described above. However, the present exemplary embodiment is not limited to this. More specifically, it is also useful if the CPU 211 merely notifies a warning message to the user that the user has selected a plurality of process definition files in combination in one selection operation that require the execution of a plurality of times of reading operations.

Each of the first through sixth exemplary embodiments of the present invention described above can be separately and independently implemented or can be implemented as a combination of a plurality of the above-described exemplary embodiments where necessary.

In each of the first through sixth exemplary embodiments of the present invention, the image processing system includes the administrator PC 101, the file management server 102, the MFP 103, and the transmission server 104. However, the functions of the administrator PC 101, the file management server 102, the MFP 103, and the transmission server 104 need not provided on separate apparatuses.

More specifically, the functions of two or more apparatuses (e.g., the functions of the MFP 103 and the transmission server 104) may be provided in one apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). The program may be carried on a carrier medium such as a computer readable storage medium or a transmission medium (signal).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-281856 filed Oct. 31, 2008, which is hereby incorporated by reference herein in its entirety.

What is claimed is:

1. An image processing apparatus comprising:
a reading unit configured to read an image of a document to generate image data based on the read image;
an acquisition unit configured to acquire a process definition file, which defines a content of reading processing to be executed by the reading unit and a content of transmission processing for transmitting image data generated by the reading unit;
a reading control unit configured to cause the reading unit to execute the reading processing to generate image data according to a definition included in the process definition file acquired by the acquisition unit;

a duplication unit configured to generate a plurality of pieces of image data by duplicating one piece of image data generated by the reading processing;

a file selection unit configured to select the process definition file acquired by the acquisition unit; and a transmission control unit configured to, when a plurality of process definition files is selected by the file selection unit and the selected plurality of process definition files is instructed to be executed, cause image data generated by the reading processing to be transmitted according to a definition included in each of the selected plurality of process definition files; wherein the image processing apparatus is in communication with an external apparatus, the transmission control unit includes a requesting unit configured to issue a request for requesting the external apparatus to transmit the image data generated by the reading processing according to the definition included in each of the selected plurality of process definition files, and the request unit is configured to issue the request by associating one of the plurality of pieces of image data generated by the duplication unit with one of the selected plurality of process definition files and transmitting the mutually associated one piece of image data and one process definition file to the external apparatus.

2. The image processing apparatus according to claim 1, wherein the reading control unit is configured to, when a plurality of process definition files is selected by the file selection unit and the selected plurality of process definition files is instructed to be executed, cause the reading unit to execute the reading processing according to definitions included in the selected plurality of process definition files.

3. The image processing apparatus according to claim 1, further comprising a requesting method selection unit configured to, when the requesting unit issues the request, select between a requesting method for transmitting, to the external apparatus, one piece of image data generated by the reading processing and the selected plurality of process definition files by one transmission operation and another requesting method for associating one of the plurality of pieces of image data generated by the duplication unit with one of the selected plurality of process definition files and transmitting, to the external apparatus, the mutually associated one piece of image data and one selected process definition file.

4. The image processing apparatus according to claim 3, wherein the requesting method selection unit is configured to execute the selection according to information about a capacity of the external apparatus acquired from the external apparatus.

5. The image processing apparatus according to claim 1, further comprising a restriction unit configured to restrict the selection unit from selecting a plurality of process definition files according to a content of the process definition file acquired by the acquisition unit.

6. The image processing apparatus according to claim 5, wherein the restriction unit is configured to, when one process definition file is selected by the file selection unit, identify another process definition file that cannot be selected simultaneously with the selected one process definition file and to restrict the file selection unit from selecting the identified another process definition file.

7. The image processing apparatus according to claim 1, wherein a transmission protocol and a destination address are defined in each of the selected plurality of process definition files.

8. The image processing apparatus according to claim 7, wherein the transmission protocol is email.

9. The image processing apparatus according to claim 7, wherein the transmission protocol is FTP.

10. A method for controlling an image processing apparatus including a reading unit configured to read an image of a document to generate image data based on the read image, the method comprising:

acquiring a process definition file, which defines a content of reading processing to be executed by the reading unit and a content of transmission processing for transmitting image data generated by the reading unit;

causing the reading unit to execute the reading processing to generate image data according to a definition included in the acquired process definition file;

generating a plurality of pieces of image data by duplicating one piece of image data generated by the reading processing;

selecting the acquired process definition file; and when a plurality of process definition files is selected and the selected plurality of process definition files is instructed to be executed, causing image data generated by the reading processing to be transmitted according to a definition included in each of the selected plurality of process definition files; wherein the image processing apparatus is in communication with an external apparatus;

a request for requesting the external apparatus to transmit the image data generated by the reading processing according to the definition included in each of the selected plurality of process definition files is issued; and wherein the request is issued by associating one of the plurality of pieces of image data generated by the duplicating with one of the selected plurality of process definition files and transmitting the mutually associated one piece of image data and one process definition file to the external apparatus.

11. A non-transitory computer-readable storage medium storing a program for causing a computer to execute the method defined in claim 10.

12. The method according to claim 10, wherein a transmission protocol and a destination address are defined in each of the selected plurality of process definition files.

13. The method according to claim 12, wherein the transmission protocol is email.

14. The method according to claim 12, wherein the transmission protocol is FTP.

* * * * *